United States Patent [19]

Vlahos

[11] 4,409,611
[45] Oct. 11, 1983

[54] ENCODED SIGNAL COLOR IMAGE COMPOSITING

[75] Inventor: Petro Vlahos, Tarzana, Calif.

[73] Assignee: Vlahos-Gottschalk Research Corp., now Ultimatte Corp., Reseda, Calif.

[21] Appl. No.: 305,073

[22] Filed: Sep. 24, 1981

[51] Int. Cl.³ .......................................... H04N 9/535
[52] U.S. Cl. ...................................................... 358/22
[58] Field of Search ................................. 358/22, 183

[56] References Cited

U.S. PATENT DOCUMENTS

| | | | |
|---|---|---|---|
| 3,595,987 | 7/1971 | Vlahos | 358/22 |
| 4,007,487 | 2/1977 | Vlahos | 358/22 |
| 4,100,569 | 7/1978 | Vlahos | 358/22 |

FOREIGN PATENT DOCUMENTS 2044036  10/1980  United Kingdom ................... 358/22

OTHER PUBLICATIONS

Nakamura et al., "High Quality Montage Pictures by a New Color Killer Soft Chromakey System", *SMPTE Journal*, vol. 90, Feb. 1981, pp. 107-112.

*Primary Examiner*—John C. Martin
*Attorney, Agent, or Firm*—Harry R. Lubcke

[57] ABSTRACT

A linear color television compositing system of the "blue backing" type, in which the foreground signal channel is always open. The foreground and background channels are not switched by the edges of the pictorial subject matter.

The hue of the colored (typically blue) background is removed by vector subtraction and the luminance thereof by arithmetic subtraction.

Flare illumination of the foreground subject(s) from the backing is removed, improving color fidelity.

The background pictorial scene that takes the place of the removed colored backing area is linearly turned up or down, allowing shadows of foreground subjects to appear in the background.

19 Claims, 2 Drawing Figures

ENCODED SIGNAL COLOR IMAGE COMPOSITING

BACKGROUND OF THE INVENTION

This invention pertains to separate foreground and background compositing, employing a colored (i.e., blue) backing for the foreground scene.

The so-called chroma-key process for compositing was developed decades ago by engineers of the National Broadcasting Co. in New York City. This was a foreground-background switching system.

Recently, Nakamura et al modified this system to a "soft edge chroma-key", in which edges between foreground and background are purposely blurred. This tends to hide the effects of switching from foreground to background and vice versa. However, detail is lost in this boundary area.

Additionally, Nakamura added a subtraction circuit to eliminate the blue tint at the soft edge.

This system is disclosed in the SMPTE Journal, Vol. 90, No. 2, February 1981, page 107.

All chroma-key (i.e., switching devices), including the Nakamura soft edge device, suffer from two defects; i.e., loss of sharp edges on objects that have such edges, and loss of fine detail at the edges. The soft edge frequency response must be about half that of the capability of the foreground camera.

Vlahos U.S. Pat. No. 3,595,987 introduces the concept of developing a control signal that is proportional to the brightness and visibility of the colored backing, also of controlling the level of the background scene as a linear function of the amplitude of the control signal, and also of eliminating the blue backing by limiting that video signal amplitude to a maximum that is represented by the amplitude of one of the other primary colors.

The patent does not disclose removal of residual contaminating colors by subtraction, the rejection of foreground luminance because of secondary illumination from the backing, of encoded video, nor defining mixing as additive or non-additive.

Vlahos U.S. Pat. No. 4,007,487 introduces a $(B-G)+(G-R)$ control signal; the $(G-R)$ term permits the reproduction of blue eyes. A color ratio is established to distinguish the colored backing from the subject even with a backing of non-uniform brightness.

The patent does not disclose removal of contaminating colors by subtraction, nor of removing or retaining secondary luminance on the subject. Nor does it disclose encoded video, or specify additive or non-additive mixing.

Vlahos U.S. Pat. No. 4,100,569 introduces full rejection of the colored backing by subtracting its red, green and blue components in accordance with a control signal that varies as a function of the intensity of these colors as they appear in the backing area.

A control for the color magenta is provided. Control $E_c$ is described, but without the $-K(1-B)$ term.

An encoded color signal is not disclosed, nor is mixing of foreground and background video signal specified as additive or non-additive.

SUMMARY OF THE INVENTION

The present invention is a linear non-switching compositing system that does not switch between foreground and background scenes. This is opposed to the foreground/background chroma-key switching systems.

The foreground channel is always open. Except for the specific hue of the colored (blue) backing, all information seen by the foreground camera is retained in the final composite image up to the limiting resolution of the camera. The normal transparency of smoke, dust, glassware, etc. is retained.

In the operation the specific hue of the colored backing is removed by a vector subtraction process.

The colored backing also reflects this hue onto foreground subjects, causing color contamination of these subjects. Also, the field of the camera lens is essentially filled with the color of the backing, which induces a lens flare of that color over the entire field.

The subtraction process of this invention removes the hue of the backing color from the backing area and also the hue contamination of the foreground subjects, either by reflection thereonto or as added by the lens flare.

The subtraction process has previously been applied to the individual red, green and blue (RGB) components of the backing color, as in the Vlahos U.S. Pat. No. 4,100,569.

In this invention the subtraction is applied to the 3.58 megahertz (mHz) vector after the encoding process.

The luminance of the colored backing is removed by arithmetic subtraction. With both the chroma and the luminance of the colored backing subtracted from the foreground scene signal, the backing area becomes black. Thus, there is no need to switch it off.

The background scene that takes the place of the now removed colored backing area is not switched as such; rather, it is turned up or down in intensity over a continuous range from zero (off) to unity (on). The turn-on of the background scene depends upon the brightness of the colored backing and the extent to which the colored backing is obscured by opaque and/or semi-transparent foreground subjects, or as reduced in intensity by shadows falling upon the backing.

In this way, shadows cast upon the colored backing are retained and transferred onto the background scene.

Because only the specified hue of the backing is subtracted, other colors are not affected. If the backing is an ultramarine blue, for example, all evidence of this blue flare on faces, wardrobe and the over-all discoloration from the lens flare is eliminated. However, importantly, the process of this invention does not alter the natural reproduction of blue eyes and other shades of blue.

DETAILED DESCRIPTION OF THE PREFERRED EMBODIMENTS

Figure 2:
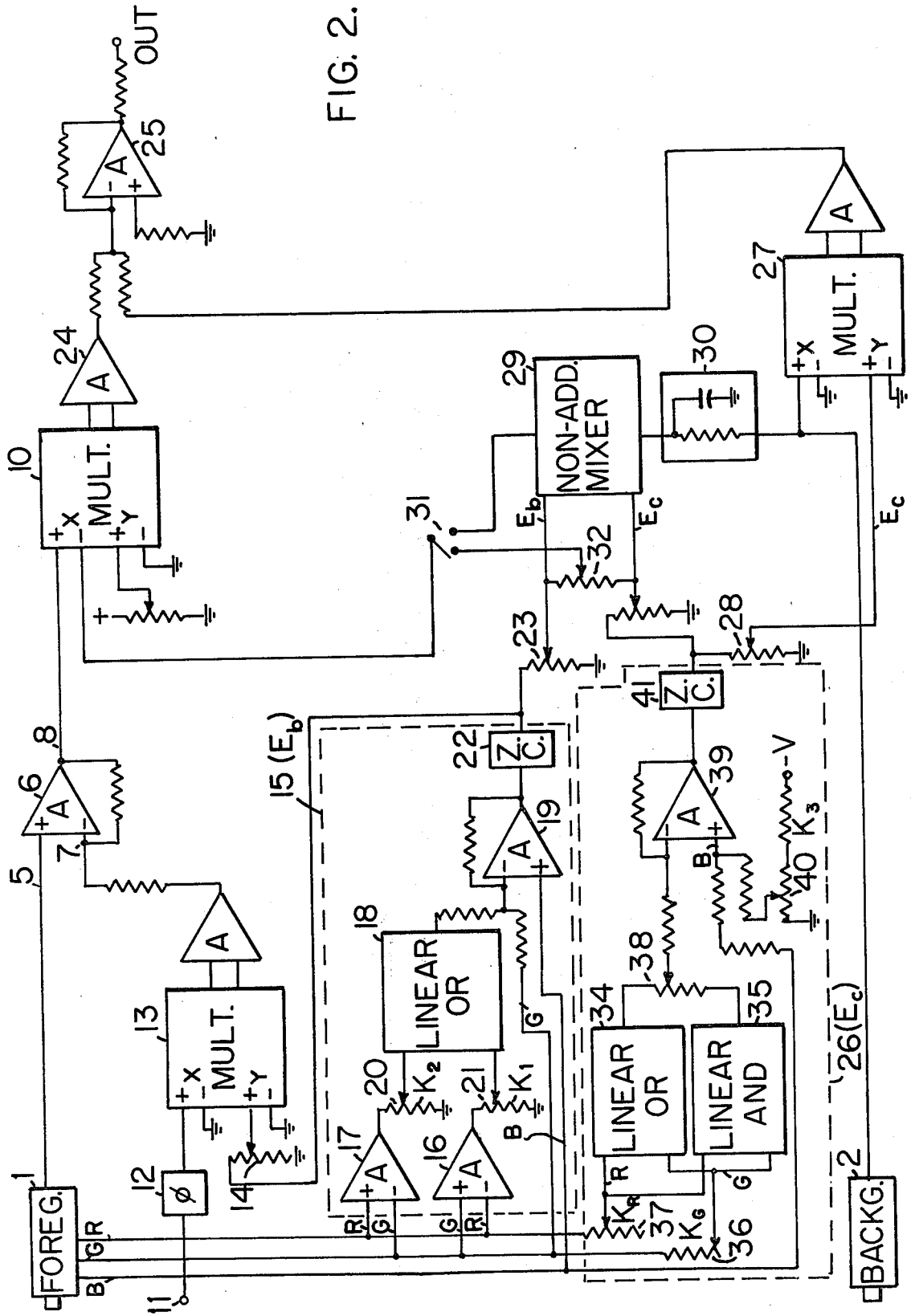
FIG. 2 is a schematic diagram of the preferred form of the invention.

In FIG. 2, the composite (encoded) video signal, as well as the individual red, green and blue video outputs of television color camera 1 are all connected to the encoded signal color image compositing system of this invention.

The composite video signal via conductor 5 is connected to + differential amplifier 6, which may be a Harris HA2625. The colored backing chroma is removed in this amplifier by an input to the − terminal thereof from apparatus to be later described.

The output from amplifier 6, via conductor 8, enters the + x input of multiplier 10. This may be a Motorola four-quadrant multiplier MC1595L. Operational amplifier 24 follows the multiplier to remove the inherent offset of the multiplier.

Output amplifier 25 sums the foreground and the background signals delivered to its inverting (−) input; i.e., the output from amplifiers 24 and 27. Amplifier 25 may be a Harris HA5195 operational amplifier.

The R G B video signal outputs from camera 1 are connected to both chroma control circuit entity 15 to produce a voltage $E_b$ and to background scene control circuit entity 26 to produce a voltage $E_c$.

In entity 15, differential amplifier 16 provides a G−R term (green minus red) to potentiometer 21, which may also be termed a color gate. Differential amplifier 17 provides a R−G term (red minus green) to potentiometer 20, another color gate.

The outputs of potentiometers 20 and 21 enter the two input terminals of linear OR gate 18. This may consist of four transistors, as supplied by a Motorola MPQ6002 PNP/NPN transistor integrated circuit (IC). The output of OR gate 18 is connected to the negative input terminal of differential amplifier 19, as is the green video (G). The blue video (B) is connected to the positive input terminal of differential amplifier 19.

The output of amplifier 19 is connected to zero clipper 22, which removes any negative signals. This output is an electronic evaluation of equation $E_b$, to be presented later. Zero clip 22 may be an OR gate with one input connected to ground.

The logic to evaluate equation $E_c$ of entity 26 includes linear OR gate 34, linear AND gate 35 and operational amplifier 39, along with potentiometer 40 and zero clip 41. OR gate 34 is identical to OR gate 18. The AND gate 35 is an inverted OR gate. Four transistors may be used to construct both the OR and AND gates.

The green (G) and red (R) video signals from camera 1 are independently controlled in amplitude by potentiometers 36 and and 37, respectively. These are both connected to linear OR gate 34 and linear AND gate 35. The output of gate 34 is connected to one extremity of potentiometer 38 and the output of gate 35 is connected to the other extremity. The wiper connection of this potentiometer allows an exclusive output of OR gate 34 at its upper extremity, or the exclusive output of AND gate 35 at its lower extremity. At intermediate positions a selected proportion of the two gates outputs are provided.

The wiper of 38 is connected to the inverting input of differential amplifier 39, and is subtracted from the blue (B) video signal from camera 1, which is connected to the non-inverting input of amplifier 39.

Also connected to the non-inverting input of amplifier 39 is potentiometer 40. The output of amplifier 39 is an electronic evaluation of the $E_c$ equation, of which potentiometer 40 implements the last term.

The background pictorial subject matter is supplied by camera 2. This may alternately be an equivalent source, such as a pre-recorded video tape, a film scanner, or the like. The signal therefrom is in composite (encoded) form. It enters the +x input to multiplier 27. Control signal $E_c$ enters the +y input of the same multiplier. The thus controlled background signal passes through an operational amplifier to remove the inherent offset of the multiplier, as was discussed in connection with elements 10 and 24.

The background output signal is conveyed to the inverting input of amplifier 25, where it is added to the foreground video signal.

Non-additive mixer 29 may be comprised of two multipliers, such as the Motorola MC1595 multipliers. The two x inputs of these multipliers are supplied by the outputs of entities 15 and 26, $E_b$ and $E_c$, respectively. The y inputs are supplied by a signal from filter 30. The input to the filter is the composite video signal from background camera 2. The filter is typically of the resistor-capacitor type with a time constant of approximately 1/30 second.

The y inputs are reversed, so that the same rising signal amplitude from filter 30 causes $E_c$ to increase at the mixer output while causing $E_b$ to decrease by an equal amount, thus maintaining a constant output.

In the apparatus, unless otherwise specified, the multipliers, as 10, 13, 27, may be the Motorola type MC1595L. The differential amplifiers may be Harris HA2625. The OR gates and AND gates are conveniently constructed by utilizing four transistors in a common package, such as the Motorola type MPQ6002.

A resistance value of 1,000 ohms is suitable for all potentiometers. A resistance value of 1,000 ohms is also suitable for all input, summing, and feedback resistors associated with the operational amplifiers.

Considering now the functioning of the apparatus, the positive input 5 of differential amplifier 6 is provided with the usual functions of isolation, and dc restoration (clamping), but these are not shown in FIG. 2.

The video signal at 5 includes a range of frequencies representing the detail in the foreground image. Also present in this video signal is the 3.58 mHz color subcarrier (for NTSC). The phase angle (vector) represents the hue and the amplitude represents the saturation of a given foreground color. At the points in the scene containing a bright blue of the blue backing, a specific vector angle and amplitude will be generated in the encoder to represent the specific blue paint or fabric used for the backing. This is the normal function of the NTSC encoding system.

A second vector is generated in this invention that has exactly the same phase angle and amplitude as the vector representing the blue backing, the amplitude of which increases and decreases in exactly the same manner as the vector for the blue backing, thus exhibits all the same changes in illumination level. The electrical representation of this second vector is fed into the − input 7 of differential amplifier 6. This completely cancels, by common mode rejection, the picture vector fed in at + input 5. Output 8 will therefore contain only luminance information of the blue backing. This is fed to multiplier 10.

The second vector is generated as follows. The 3.58 mHz color subcarrier is normally routed to all color cameras, and is also routed to input terminal 11 in FIG. 2. It then passes to phase shifter 12, which is connected to the +x input of multiplier 13. Phase shifter 12 is capable of rotating the phase angle of the subcarrier through 360°. Phase shifter 12 is adjusted to match the phase angle from terminal 11 to the phase angle of the 3.58 subcarrier that represents the colored backing as it appears in the video signal on conductor 5.

The amplitude of the 3.58 mHz subcarrier leaving multiplier 13 is the product of the x and y inputs thereto. The y input is therefore adjusted by control 14 to produce a level at point 7 to equal the 3.58 vector amplitude representing the colored backing appearing on conductor 5. Cancellation at output 8 is thus obtained.

The voltage output from entity 15 is $E_b$, the amplitude of which is adjusted by control potentiometer 14. The logic equation defining the vector amplitude $E_b$ is as follows:

$$E_b = K[(B-G)^+ - K_1(G-R)^+ - K_2(R-G)^+]^+ \quad (1)$$

In the equation (1), the + signs signify that all terms must have positive, not negative, values. This is insured by zero clip 22 in FIG. 2. The various values of the individual terms and of the coefficients K have values between 0 and 1.

The value of coefficient K is determined by the adjustment of potentiometer 14, of $K_1$ by potentiometer 21, and of $K_2$ by potentiometer 20.

Assume that the idealized video values for the blue backing are Blue = 1, Green = 0 and Red = 0. The signal level to control 14 is therefore 1.0 for that area of the foreground scene that consists of the blue backing. As a practical matter, the blue video amplitude is not quite 1.0 and the green (or red) video is not quite 0, and the difference of (B − G) may vary.

The above condition, where the generated vector at 7 matches the amplitude and phase angle of the vector at 5, holds throughout the area covered by the blue backing regardless of the changes and variations in the light level falling on the blue backing. A deep ultra-marine blue painted backing, for example, will have a blue content (the reflectivity) of approximately 60%, a green content of approximately 20%, and a red content of approximately 20%.

Changes in the light level will change all three component vectors by an equal percentage. The vector sum will change in amplitude but will not change in phase angle. The vector angle does not change because the hue (color) of the backing is independent of the light level falling upon it. That is, the shadow of a performer will result in a shorter vector, but the phase angle will remain the same.

If constants $K_1$ and $K_2$ in equation (1) are set to zero, the equation becomes $E_b = K(B-G)^+$. When foreground subject-matter other than the blue backing is considered, all colors will have a green content that is equal to or greater than the blue content, with the exception of the colors blue and magenta (purple). This relationship is inherent in the physics of color.

Table I lists several colors in column 1, some of which include color contamination by secondary illumination from the blue backing. The B (blue), G (green), and R (red) color components of the listed colors are shown in columns 2, 3 and 4. These component values were obtained by measurement, but are also to be found in handbooks of color science.

The value of blue that should exist if the backing had no color and did not cause blue flare on the subjects is shown in column 5. Column 6 lists the amount of blue to be removed so as to eliminate the blue of the backing as well as its influence on foreground subjects.

TABLE I

| COLUMN 1 OBJECT | 2 B | 3 G | 4 R | 5 CORRECT VALUE OF BLUE | 6 EXCESS BLUE | 7 $B = \frac{G+R}{2}$ | 8 $B-G^+$ | 9 $G-R^+$ | 10 $R-G^+$ | 11 $(B-G)^+$ $-(G-R)^+$ | 12 $(B-G)^+$ $-(G-R)^+$ $-(R-G)^+$ |
|---|---|---|---|---|---|---|---|---|---|---|---|
| BLUE BACKING | .6 | .2 | .2 | .2 | .4 | .4 | .4 | 0 | 0 | .4 | .4 |
| WHITE | .8 | .8 | .8 | .8 | 0 | 0 | 0 | 0 | 0 | 0 | 0 |
| BLUE FLARE ON WHITE | .9 | .8 | .8 | .8 | .1 | .1 | .1 | 0 | 0 | .1 | .1 |
| BLACK | 0 | 0 | 0 | 0 | 0 | 0 | 0 | 0 | 0 | 0 | 0 |
| BLUE FLARE ON BLACK | .2 | 0 | 0 | 0 | .2 | .2 | .2 | 0 | 0 | .2 | .2 |
| BLUE EYES | .8 | .6 | .4 | .8 | 0 | (.3) | .2 | .2 | 0 | 0 | 0 |
| MAGENTA | .8 | .2 | .8 | .8 | 0 | (.3) | .6 | 0 | .6 | (.6) | 0 |
| YELLOW | .2 | .8 | .8 | .2 | 0 | 0 | 0 | 0 | 0 | 0 | 0 |
| GREEN | .2 | .8 | .2 | .2 | 0 | 0 | 0 | .6 | 0 | 0 | 0 |
| CYAN | .8 | .8 | .2 | .8 | 0 | (.3) | 0 | .6 | 0 | 0 | 0 |
| FLESH | .3 | .3 | .7 | .3 | 0 | 0 | 0 | 0 | .4 | 0 | 0 |
| BLUE FLARE ON FLESH | .4 | .3 | .7 | .3 | .1 | (0) | .1 | 0 | .4 | .1 | (0) |

In most chroma-key devices the equation $B-(G+R)/2$ is used as the control signal for switching. When used as the criterion for blue removal, the result in column 7 is obtained. Note that the blue removal is incorrect for blue eyes, magenta, cyan and flare on flesh tones. (Numeral in parentheses). For blue eyes no blue removal is desired (column 6) but chroma-key logic (column 7) shows a blue reduction of ⅜, or 37%. This results in blue eyes and bluish objects being reproduced as a pale green. Note also that the purplish tint to flesh tones is not removed.

Columns 8 through 12 illustrate the blue control logic of the present invention, as based upon equation (1). Column 8 is the basic logic (B−G). Column 9, $(G-R)^+$ is identified with color gate 21, and is required to correctly reproduce bluish objects. Column 10, $(R-G)^+$ is identified with color gate 20, and is required to correctly reproduce magenta.

In the general run of video program productions, the color magenta (purple) is rarely used in wardrobe or in commercial products. For this reason $K_2$, gate 20, is set to zero, thus eliminating the term $(R-G)^+$. Equation (1) is thus reduced to the first two terms; $(B-G)^+ - (G-R)^+$. Representative values for various colors are shown in column 11. Assuming that magenta is omitted from the foreground scene, column 11 shows that all colors are correctly reproduced.

In those rare cases where magenta is required in the foreground scene, color gate 20, $K_2(R-G)^+$, is opened just enough to permit the reproduction of magneta. When gate 20 is fully open, the results of column 12 are obtained.

Note that the values in column 11 (or 12) are applied to multiplier 13 of FIG. 2. The numerical value in column 11 is the amount of the blue vector supplied to the negative terminal of differential amplifier 6. Thus, this is the amount of blue removed from the video signal. It is principally in the blue backing area, and in white and flesh colors flooded with blue flare light, that blue removal is required. All other colors are true colors and are unaffected. By adjusting control 14, connected to multiplier 13, equation (1), $E_b$, generates the correct level of vector to be subtracted. The blue backing is thus reproduced as a gray backing.

By definition, a white subject reflects R G B equally; i.e., 0.8, 0.8, 0.8. Line 3 of Table I, hwever, shows the R G B values for white that is flooded with blue flare light to be 0.9, 0.8, 0.8. Blue is shown to be in excess of green or red by 0.1. Such excess blue would have caused a blue tint to the white subject. However, column 11 shows a subtraction value of 0.1 for removing the blue flare light.

The blue backing, reflecting blue light onto a person's face, the bottom line in Table I, will increase the blue content of the face. This gives it a magenta look. Column 11 shows a subtraction value of 0.1. This exactly removes the excess blue.

The logic of equation (1), $E_b$, not only reduces the color (chroma vector) of the blue backing to zero; it also removes the blue flare light that would otherwise affect the colors of subjects in the foreground scene. This is the significance of the numbers in columns 11 and 12 of Table I.

$K_1$ of equation (1), $E_b$, must be unity if blue eyes and other pastel blue colors are to be reproduced as blue. $K_2$ must be unity to reproduce magenta colors. When $K_2$ is at zero, magenta colors are reproduced as reddish colors. However, with $K_2$ at zero, all blue flare in the camera lens and on wardrobe and flesh tones is entirely eliminated.

Equation (1), $E_b$, is implemented by entity 15 of FIG. 2. Differential amplifier 16 provides the term (G−R), through gate 21. Differential amplifier 17 provides the (R−G) term, through gate 20. Linear OR gate 18 passes whichever term is positive.

The (B−G) term of equation (1) is formed at the + and − input terminals of differential amplifier 19, which also subtracts the (G−R) or the (R−G) term. Potentiometers 14, 20 and 21 provide the K, $K_1$, and $K_2$ of the equation.

Having removed, by subtraction, the 3.58 vector that represented the hue of the blue backing, the signal leaving amplifier 6 via conductor 8 and entering multiplier 10 contains only luminance (black and white) information, which represents the "brightness" of the blue backing. It is necessary to remove this luminance so that it does not cause a gray veil over the entire background scene.

Chroma-key apparatus removes the luminance and the chroma of the backing by switching-off the foreground scene in the blue backing area.

In the present invention the luminance of the blue backing area is removed by arithmetic subtraction.

The luminance component of the blue backing and of the foreground objects resulting from secondary illumination from the backing are removed from the video signal by the connection of the $E_b$ output into the negative terminal of the x input of multiplier 10. Luminance bias control 23 allows the proper amplitude to be selected. Thus, the output of amplifier 24 has zero chroma and zero luminance in the blue backing area, while showing normal chroma and luminance for other foreground subject areas. Since the backing is thus in no way reproduced, the foreground video channel may be retained fully "on", and so reproduces all detail seen by the camera 1.

The foreground video signal, which chroma and luminance removed in the region of the blue backing is routed to combining amplifier 25, where the background scene is added to those areas from which the blue has been removed. Amplifier 25 sums the two signals by simple addition, as opposed to non-additive mixing required by soft chroma-key and other switching systems.

Background control voltage $E_c$ is generated by the circuit of entity 26 in FIG. 2. This circuit provides the following relationships:

$$E_c = K_1[B - K_2(K_r R \text{ OR } K_g G) + (1 - K_2)(K_r R \text{ AND } K_g G) - K_3(1 - B)]^+ \tag{2}$$

OR indicates the larger of G or R, and AND indicates the smaller of G or R. The + symbol indicates that negative values are clamped to zero.

Control voltage $E_c$ will be large in the blue backing area, since blue is high while both red and green are low. For any opaque object $E_c$ falls to zero. At intermediate values of blue backing intensity $E_c$ will have intermediate values. $E_c$ is directly proportional to the luminance and visibility of the blue backing, and is zero for opaque objects whether or not illumination is received from the blue backing.

$E_c$ is thus used to control the level of the background scene. This is accomplished by feeding the $E_c$ signal to the y input of multiplier 27 of FIG. 2. This control signal varies the level of the background scene from zero to an upper value determined by the adjustment of control 28. This is normally adjusted for unity gain for the background image in those areas of the blue backing that receive full illumination.

From the general equation (2), $E_c$, one can obtain the simpler equation $E_c = B - G$ by setting $K_1$ to unity, $K_2$ to unity, $K_3$ and $K_r$ is zero, and $K_g$ to unity. Similarly, by adjusting the values of the constants to other values, one can obtain $E_c = B - R$, and so on.

The number of terms employed for a suitable evaluation of $E_c$ is a function of the color purity of the colored backing, of the range of colors present in the foreground subjects, and by the presence or absence of dark glossy objects therein. The evaluation of $E_c$ is accomplished by manipulating the potentiometers representing the K's in the $E_c$ equation (2).

Elements 29, 30, 31 and 32 of FIG. 2 provide means for enhancing realism with various foreground-background subject matters.

When a subject is placed in front of a well-illuminated color backing, it will receive substantial luminance from that backing, particularly at the sides and edges of the subject. If the backing is dark or black, no such side illumination occurs.

If the foreground subject is composited into a background day scene, that scene, if real, provides substantial back and side illumination to the subject. However, if the foreground subject is composited into a background night scene, that scene provides very little illumination to the subject.

The compositing system of this invention provides the option of day or night background simulation, or any degree between the two.

For manual adjustment of what this simulation shall be switch 31 is moved to the left contact. This connects to the wiper of potentiometer 32. In FIG. 2 the top end of that potentiometer is connected to the $E_b$ output from entity 15. The bottom end of that potentiometer is connected to the $E_c$ output from entity 26. Thus, any proportion of $E_b$ vs $E_c$ can be obtained by moving the wiper. When the wiper is at the bottom of the potentiometer, $E_c$ control signal is in control and background luminance is retained (day effect). When the wiper is at the top, $E_b$ control signal is in control and background luminance is rejected (night effect). An intermediate position of the wiper provides an intermediate effect.

It is possible to obtain automatic selection (or mixing) of the $E_b$ and $E_c$ control by moving switch 31 to the right contact.

Both $E_b$ and $E_c$ control signals are inputted to non-additive mixer 29.

The background composite video signal from camera 2 is integrated by filter 30 to obtain a signal proportional to the average brightness of the background scene and is also inputted to mixer 29.

Depending upon the background brightness from filter 30 mixer 29 provides a luminance on the foreground subject as though the luminance of the background was illuminating the subject.

This automatic function is especially useful for train window scenes and the like. Should the train go through a tunnel the illumination of the subject from the background ceases, and vice versa when in daylight out of the tunnel.

Figure 1:
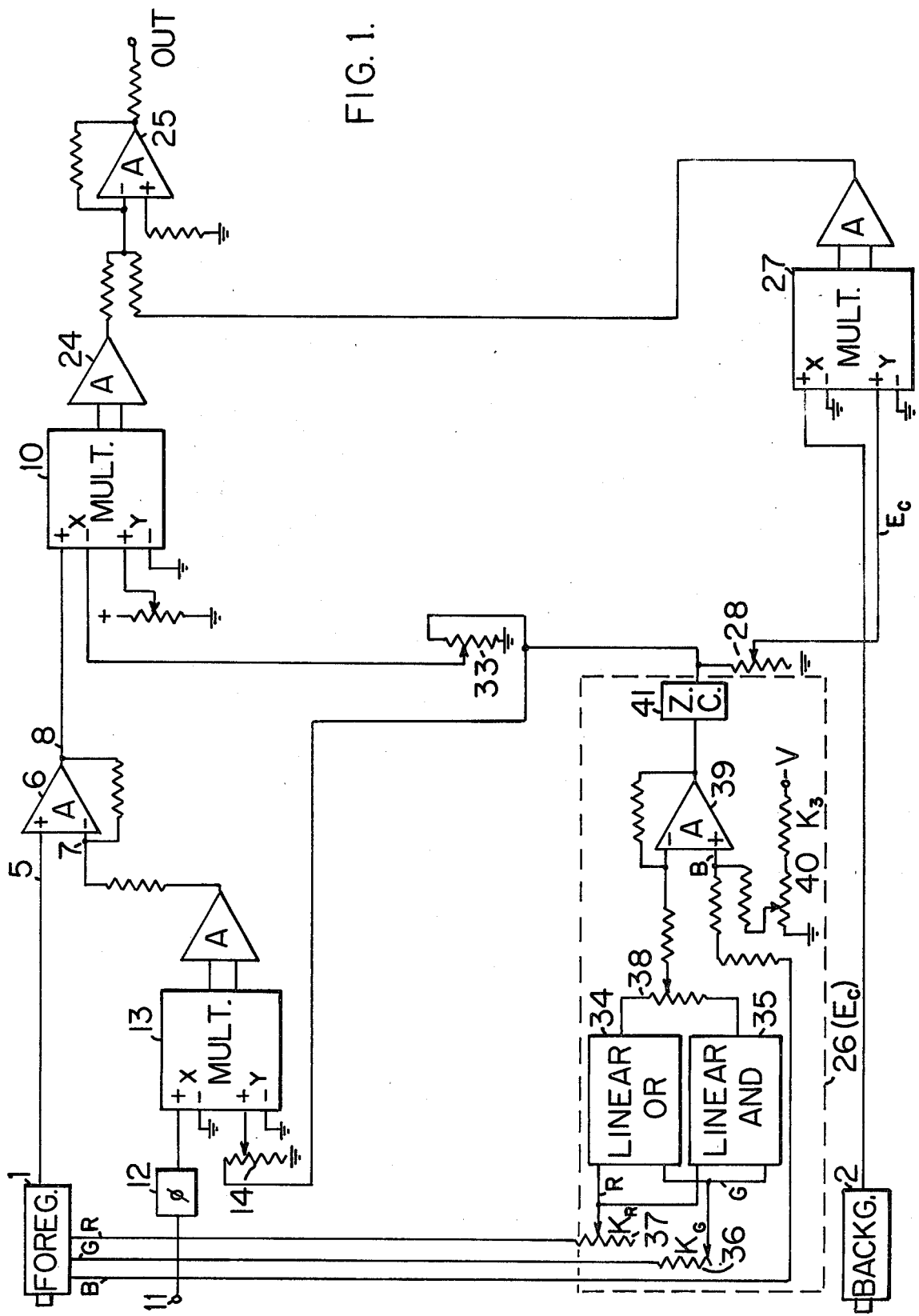
FIG. 1 is a schematic diagram of a specific simplified form of the invention.

FIG. 1 is a schematic diagram of a simplified embodiment of the subject invention, in which the equation (2), $E_c$, carries the whole control function. The apparatus of entity 26 is retained; the apparatus of entity 15 (equation (1), $E_b$,) is deleted from the showing in FIG. 2.

Additionally, switch 31, control 32, mixer 29 and integrating filter 30 are deleted, since there is no longer two control functions to switch between.

In the place of these elements potentiometer 33 is connected to the $E_c$ output of entity 26, the wiper of which is connected to the $-x$ input (differential) of multiplier 10. Also, the output of entity 26 is connected to potentiometer control 14 in the place of prior entity 15 output.

The setting of potentiometer 33 determines the level of luminance to be subtracted at the differential x input of multiplier 10.

With the simplified embodiment of FIG. 1, the turn-on of the background is proper, as with the embodiment of FIG. 2. However, the equation for $E_c$ goes to zero in the areas occupied by the foreground subject(s), thus the blue illumination from the background and lens flare are not removed.

With the simplified embodiment, particular selection of foreground colors to the degree possible to minimize the the effect of the blue illumination, is indicated. Also, the selection of a lens for camera 1 having a minimum flare is of assistance.

For reasons of simplification and clarity of explanation the color blue has been widely discussed herein. Typically, this is the color that is used in practice.

However, any color may be used for the backing in the practice of this invention. Whichever color is dominant is designated by the term B in the equations. The next strongest color is designated by the term G, while the weakest color is designated by the term R.

Should a green colored backing be employed, the blue and green video signals from camera 1 are merely interchanged as connected to entities 15 and 26 of FIG. 2.

Also, specific type numbers of named manufacturers have been given. Equivalent circuit elements that would perform the circuit function required may be substituted.

I claim:

1. The method of compositing color image video signals involving a colored backing, which comprises the method steps of;

(a) forming a control signal $E_b$ as a linear function of the red, green and blue video components of the foreground scene in accordance with the equation;

$$E_b = K[(B-G) - K_1(G-R)^+ - K_2(R-G)^+]^+,$$

(b) generating a chroma vector and adjusting the phase angle of the generated vector to match the phase angle of the vector representing the colored backing in the foreground scene video signal, (c) removing the chroma of the colored backing by vector subtraction in which the amplitude of the generated vector is controlled by $E_b$ and where K is initially adjusted to match vector amplitudes, (d) removing the spurious chroma from the foreground subject caused by illumination of the subject by colored light from the backing by setting $K_1$ to unity and $K_2$ to zero in the $E_b$ equation, (e) forming a control signal $E_c$ as a linear function of the red, green and blue video components of the foreground scene in accordance with the equation;

$$E_c = K_1[B - K_2(K_rR \text{ OR } K_gG) + (1-K_2)(K_rR \text{ AND } K_gG) - K_3(1-B)]^+,$$

(f) arithmetically subtracting $E_b$ and $E_c$ in a selected proportion from the foreground scene video signal at an amplitude that results in zero luminance over the area of the colored backing, (g) linearly controlling the level of the background image video signal in proportion to the amplitude of control signal $E_c$, (h) combining by arithmetic addition the foreground scene video signal from which has been removed the chroma and luminance of the colored backing, with the background scene video signal whose level has been controlled by $E_c$.

2. The method of claim 1, in which the control of the luminance cast upon the subject by the backing comprises the method step of:

(a) arithmetically subtracting $E_b$ and $E_c$ in a proportion selected to retain a desired level of luminance on the subject derived from the backing.

3. The method of claim 2, which comprises the method step of;

(a) the proportion between $E_b$ and $E_c$ is selected manually.

4. The method of claim 2, which comprises the additional method steps of;

(a) integrating the background scene video signal to obtain a control signal representing the average brightness of the scene, and (b) controlling the proportioning between $E_b$ and $E_c$ by the control signal.

5. An electronic image compositing system of the colored backing type, comprising;

(a) a source of foreground video signals (1) having composite, and red, green and blue output signals, (b) a source of composite background video signals (2), (c) a source of color subcarrier frequency (11), (d) means for rotating (12) the phase angle of the subcarrier frequency to match the phase angle of the chroma vector of the illuminated color backing, (e) means for generating (15) a control signal $E_b$ derived from the red, green and blue foreground signals, where said $E_b$ is proportional to the colored light emanating directly from the backing and indirectly as a reflection resulting from backing illumination of foreground subjects, (f) means for utilizing (13) said control signal $E_b$ to control the amplitude of the rotated phase angle vector of the subcarrier frequency, (g) means for subtracting (6) the amplitude controlled subcarrier frequency from the foreground video signal over the entire foreground scene, (h) means for generating (26) a control signal $E_c$ utilizing the red, green and blue foreground signals, where said $E_c$ is proportional to the intensity of the colored light emanating directly from the backing, but is unaffected by the colored light reflecting from foreground subjects, (i) means to electively (29,31) subtracting (10) $E_b$ and $E_c$ control signals from the composite foreground video signal to remove the luminance component of the colored backing therefrom, (j) means for utilizing $E_c$ control signal to linearly control (27) the level of the background video signal, and (k) means for additively combining (25) the foreground video signal and the background video signal after said signals are subjected to $E_b$ and $E_c$ control.

6. The system of claim 5, in which the means for generating control signal $E_b$ for a blue backing comprises;

(a) first means (17,20) to provide a difference signal between the red and the green foreground signals of adjustable amplitude, (b) second means (16,21) to provide a difference signal between the green and the red foreground signals of adjustable amplitude, (c) comparison means (18) to cause only the higher of the first and second means signals to output said comparison means, and (d) subtractive means (19), which subtracts from the blue video signal the green video signal and the output of comparison means (18), to provide a control signal $E_b$ for controlling the amplitude of the subcarrier vector.

7. The system of claim 6, in which;

(a) the terms blue and green video signals are interchanged and a green backing is employed.

8. The system of claim 6, in which;

(a) the terms blue and red video signals are interchanged and a red backing is employed.

9. The system of claim 5, in which the means for generating control signal $E_c$ for a blue backing comprises;

(a) a linear OR gate (34), (b) a linear AND gate (35), (c) means to adjust (36) the level of the green foreground signal to the OR and AND gates, (d) independent means to adjust the level of the red (37) foreground signal to the OR and AND gates, (e) means for proportioning (36) the outputs between the OR gate and AND gate, (f) means for subracting (39) the selected proportion of OR and AND outputs from the blue foreground video signal, and (g) means for subtracting a function (40) of the blue video signal from the blue video signal to form the control signal $E_c$.

10. The system of claim 5, in which said means for electively subtracting $E_b$ and $E_c$ control signals comprises;

(a) manual means 32 for proportioning $E_b$ and $E_c$, (b) a non-additive mixer (29) for automatic proportioning of $E_b$ and $E_c$, (c) means for selecting (31) manual or automatic proportioning between $E_b$ and $E_c$, and (d) means for integrating (30) background scene brightness for effecting control of said non-additive mixer.

11. The method of compositing color image video signals involving a colored backing, which comprises the method steps of:

(a) forming a first control signal as a function of the brightness and visibility of the colored backing and also as a function of the colored secondary illumination on foreground subjects being received from the colored backing, (b) removing the chroma of the colored backing in the backing area and removing discoloration chroma from the foreground subjects resulting from secondary illumination received from the colored backing by vector subtraction as determined by the first control signal, (c) forming a second control signal as a function of the brightness and visibility of the colored backing but not as a function of the backing illumination being reflected from foreground subjects, (d) removing the luminance of the colored backing from the foreground scene video signal in the backing area by subtraction as determined by the first or second control signal, and (e) combining the foreground scene video signal as controlled by the first control signal or as selectively controlled by the first and second control signals with the background scene video signal, the level of which has been controlled by the second control signal, to form a composite image.

12. The method of claim 11, in which;

(a) the foreground scene video and the background scene video are combined by simple addition.

13. The method of claim 11, in which;

(a) the foreground scene video and the background scene video are combined by non-additive mixing.

14. The method of claim 11, in which;

(a) the first control signal is essentially linear.

15. The method of claim 11, in which;

(a) the first control signal is essentially non-linear.

16. The method of claim 11, in which;

(a) the second control signal is essentially linear.

17. The method of claim 11, in which;

(a) the second control signal is essentially non-linear.

18. The method of claim 11, in which;

(a) the foreground scene video channel is open at full level throughout the entire video frame.

19. An electronic image compositing system of the colored backing type, comprising;

(a) a source of foreground composite video signals (1) containing the red, green and blue components of the foreground scene, (b) a source of background composite video signals (2),
(c) means for generating (15) a first control signal utilizing the red, green and blue components of the foreground video signal, said first control signal being a function of the intensity of these said components emanating directly from the colored backing and also indirectly as a reflection resulting from backing illumination of foreground subjects,
(d) means for utilizing (6) said first control signal to remove the chroma of the colored backing and to remove the chroma discoloration cast upon foreground subjects by the colored backing, by subtraction,
(e) means for generating (26) a second control signal utilizing the red, green and blue components of the foreground video signal, said second control signal being a function of the intensity of these said components emanating directly from the backing, but being unaffected by these said components reflected from foreground subjects,
(f) means for electively (29,30) subtracting (10) the first and second control signals from the composite foreground video signal to remove the luminance component of the colored backing therefrom,
(g) means (27) for utilizing the second control signal to control the level of the background video signal, and
(h) means for combining (25) the foreground video signal and the background video signal after said signals are subjected to control by said first and second control signals.

* * * * *